United States Patent
Sawai (10) Patent No.: US 10,836,441 B2
(45) Date of Patent: Nov. 17, 2020

(54) FUEL CELL VEHICLE CYLINDER SUPPORT STRUCTURE

(71) Applicant: TOYOTA JIDOSHA KABUSHIKI KAISHA, Toyota (JP)

(72) Inventor: Osamu Sawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 41 days.

(21) Appl. No.: 16/054,424

(22) Filed: Aug. 3, 2018

(65) Prior Publication Data
US 2019/0047633 A1 Feb. 14, 2019

(30) Foreign Application Priority Data

Aug. 9, 2017 (JP) .................. 2017-154467

(51) Int. Cl.
| | |
|---|---|
| B60K 1/00 | (2006.01) |
| B62D 25/20 | (2006.01) |
| B60K 15/03 | (2006.01) |
| B60K 15/07 | (2006.01) |
| B60K 15/063 | (2006.01) |

(52) U.S. Cl.
CPC .... *B62D 25/2009* (2013.01); *B60K 15/03006* (2013.01); *B60K 15/07* (2013.01); *B62D 25/2072* (2013.01); *B60K 2015/0634* (2013.01); *B62D 25/2036* (2013.01)

(58) Field of Classification Search
CPC ............ B62D 25/2009; B62D 25/2072; B62D 25/2036; B62D 25/00; B62D 21/00; B62D 21/16; B62D 21/15; B62D 21/157; B60K 15/07; B60K 15/03006; B60K 15/00; B60K 15/03; B60K 15/067; B60K 15/063; B60K 2015/0634; B60K 2015/03118; B60K 2015/03315; B60K 2015/0638; B60K 2015/03164; B60K 2015/0675
See application file for complete search history.

(56) References Cited

U.S. PATENT DOCUMENTS

| | | | | |
|---|---|---|---|---|
| 5,443,578 | A * | 8/1995 | Davis, Jr. ......... | B60K 15/03006 220/581 |
| 5,658,013 | A * | 8/1997 | Bees ..................... | B60K 15/03 280/831 |
| 6,418,962 | B1 * | 7/2002 | Wozniak ................ | B60K 15/07 137/266 |
| 6,481,751 | B1 * | 11/2002 | Davis, Jr. ......... | B60K 15/03006 180/69.5 |
| 6,974,156 | B2 * | 12/2005 | Kosuge ............ | B60K 15/03006 280/831 |

(Continued)

FOREIGN PATENT DOCUMENTS

| | | |
|---|---|---|
| JP | 11-334392 | 12/1999 |
| JP | 2000-514011 A | 10/2000 |

(Continued)

*Primary Examiner* — James M Dolak
(74) *Attorney, Agent, or Firm* — Oblon, McClelland, Maier & Neustadt, L.L.P.

(57) ABSTRACT

Plural canister bodies supported by rocker members are disposed below a floor panel. The canister bodies are housed in a case. Lower couplers are disposed above the canister bodies. The lower couplers abut a cover member of the case. Upper couplers are disposed between the cover member and the floor panel.

15 Claims, 7 Drawing Sheets

(56) References Cited

U.S. PATENT DOCUMENTS

| | | | | |
|---|---|---|---|---|
| 7,232,156 | B2 * | 6/2007 | Rife | B60K 15/063 |
| | | | | 280/834 |
| 7,270,209 | B2 * | 9/2007 | Suess | B60K 15/03006 |
| | | | | 180/69.5 |
| 7,303,211 | B2 * | 12/2007 | Borroni-Bird | B60K 1/04 |
| | | | | 280/781 |
| 8,672,359 | B2 * | 3/2014 | Ohashi | B60K 1/04 |
| | | | | 180/69.4 |
| 9,174,531 | B2 * | 11/2015 | Finck | B60K 15/063 |
| 9,878,611 | B1 * | 1/2018 | Abd Elhamid | F02B 43/10 |
| 10,421,355 | B2 * | 9/2019 | Kataoka | B60K 15/07 |
| 10,538,159 | B2 * | 1/2020 | Kataoka | B60K 15/03006 |
| 10,696,155 | B2 * | 6/2020 | Sloan | F17C 13/084 |
| 2003/0178422 | A1 | 9/2003 | Kosuge et al. | |

FOREIGN PATENT DOCUMENTS

| | | |
|---|---|---|
| JP | 2003-267067 | 9/2003 |
| JP | 2005-145177 | 6/2005 |
| WO | 2014/103638 A1 | 7/2014 |

\* cited by examiner

FUEL CELL VEHICLE CYLINDER SUPPORT STRUCTURE

CROSS-REFERENCE TO RELATED APPLICATION

This application is based on and claims priority under 35 USC 119 from Japanese Patent Application No. 2017-154467 filed on Aug. 9, 2017 the disclosure of which is incorporated by reference herein.

BACKGROUND

Technical Field

The present disclosure relates to a vehicle lower section structure.

Related Art

Japanese Patent Application Laid-Open (JP-A) No. 2003-267067 (Patent Document 1) discloses a fuel tank fixing structure in which a fuel tank is configured by coupling together plural cylindrical tank bodies, and the fuel tank is fixed at an installation location in a vehicle. When installing a high pressure canister employed as a fuel tank to a vehicle, some ingenuity is needed with regard to effective implementation of the high pressure canister in consideration of the position of the high pressure canister and its relationship with other components.

SUMMARY

For example, no thought is given to the relationship with a floor panel in cases in which a high pressure tank is disposed in a lower section of a vehicle. It is conceivable that a floor panel might be deformed out-of-shape when a large load acts from above the floor panel. In consideration of the above circumstances, an object of the present disclosure is to obtain a vehicle lower section structure capable of improving the load-bearing performance of a floor panel.

A vehicle lower section structure according to a first aspect includes a floor panel, a high pressure canister, and a load transmission member. The floor panel is provided at a lower section of a vehicle cabin. The high pressure canister is circular cylinder shaped, and is disposed below the floor panel and is supported by a vehicle framework member. The load transmission member is disposed between the floor panel and the high pressure canister, and transmits load from the floor panel to the high pressure canister.

The vehicle lower section structure according to the first aspect includes the circular cylinder shaped high pressure canister disposed below the floor panel. The high pressure canister is supported by the vehicle framework member. The load transmission member is disposed between the floor panel and the high pressure canister. The load transmission member transmits load from the floor panel to the high pressure canister. Accordingly, when load is input to the floor panel from above, the load is transmitted to the high pressure canister through the load transmission member. Since the high pressure canister is supported by the vehicle framework member, the load borne by the high pressure canister is transmitted to the vehicle framework member. This thereby enables load-bearing performance to be improved in comparison to cases in which load is borne by the floor panel alone.

In a vehicle lower section structure according to a second aspect, the load transmission member is formed by an elastic body having elastic properties.

In the vehicle lower section structure according to the second aspect, forming the load transmission member from an elastic body enables load from the floor panel to be transmitted to the high pressure canister while absorbing the load with the elastic body.

A vehicle lower section structure according to a third aspect further includes a support panel that is disposed so as to cover a lower face of the high pressure canister and that supports the high pressure canister. Moreover, the vehicle framework member is configured by a pair of rocker members arranged on each vehicle width direction outer side and extending along a vehicle front-rear direction. The support panel is coupled to the rocker members at both vehicle width direction edge portions of the support panel and is disposed between the pair of rocker members.

In the vehicle lower section structure according to the third aspect, the lower face of the high pressure canister is covered by the support panel. This thereby enables the high pressure canister to be protected from impact from below the vehicle or being struck by foreign objects.

A vehicle lower section structure according to a fourth aspect further includes a box-shaped case including a bottom wall formed by at least part of the support panel, a peripheral wall projecting upward from the bottom wall so as to surround the bottom wall, and a cover member disposed on the opposite side of the peripheral wall to the bottom wall. The high pressure canister is housed within the case. The load transmission member includes an upper coupler coupling an upper face of the cover member and the floor panel together, and a lower coupler coupling a lower face of the cover member and the high pressure canister together.

In the vehicle lower section structure according to the fourth aspect, the high pressure canister is housed inside the box-shaped case. This thereby enables foreign objects and the like to be suppressed from entering the case, enabling the high pressure canister to be protected.

In a vehicle lower section structure according to a fifth aspect, plural of the high pressure canisters are disposed along the floor panel such that a cylinder axial direction of the each high pressure canister runs in the same direction.

In the vehicle lower section structure according to the fifth aspect, plural of the high pressure canisters are disposed running in the same direction as each other, thereby enabling higher density placement to be achieved, and thus enabling a greater number of the high pressure canisters to be disposed below the floor panel.

In a vehicle lower section structure according to a sixth aspect, the high pressure canister is disposed with its length direction running in a vehicle front-rear direction.

In the vehicle lower section structure according to the sixth aspect, the length direction of the high pressure canister is disposed running in the vehicle front-rear direction. This thereby enables the length of a single high pressure canister to be made longer than in cases in which the high pressure canisters are disposed with their length direction running in the vehicle width direction. A greater capacity can thus be secured with fewer of the high pressure canisters when high pressure canisters of the same diameter are disposed.

As described above, the vehicle lower section structure according to the first aspect enables the load-bearing performance of the floor panel to be improved using the high pressure canister.

The vehicle lower section structure according to the second aspect is capable of absorbing load from the floor panel using the elastic body.

The vehicle lower section structures according to the third aspect and the fourth aspect are capable of protecting the high pressure canister.

The vehicle lower section structures according to the fifth aspect and the sixth aspect are capable of improving space utilization efficiency below the floor panel.

BRIEF DESCRIPTION OF DRAWINGS

Exemplary embodiments of the present invention will be described in detail based on the following figures, wherein.

DETAILED DESCRIPTION

First Exemplary Embodiment

Explanation follows regarding a fuel cell vehicle 11 applied with a vehicle lower section structure according to a first exemplary embodiment, with reference to the drawings. Note that in the drawings, the arrow FR, the arrow UP, and the arrow RH respectively indicate the front direction, upward direction, and vehicle right side of the fuel cell vehicle 11 as appropriate. In the following explanation, unless specifically stated otherwise, reference simply to the front and rear, upward and downward, and left and right directions refers to the front and rear in a vehicle front-rear direction, upward and downward in a vehicle vertical direction, and left and right in the vehicle width direction when facing in a direction of travel.

Figure 1:
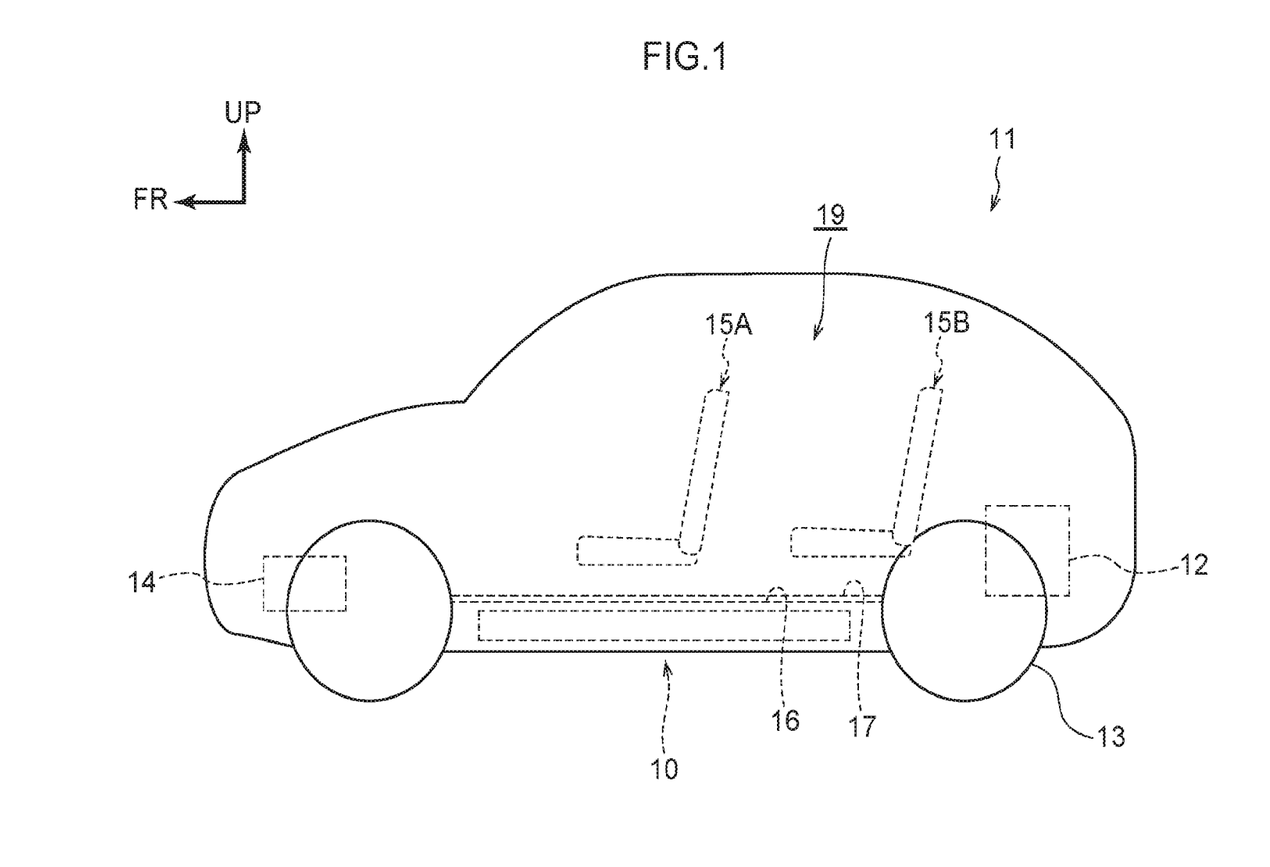
FIG. 1 is a schematic side view illustrating a fuel cell vehicle applied with a vehicle lower section structure according to a first exemplary embodiment.

As illustrated in FIG. 1, the fuel cell vehicle 11 of the present exemplary embodiment (referred to hereafter as the "vehicle 11" as appropriate) is configured including a drive motor 12, a fuel cell stack (FC stack) 14, and a high pressure canister unit 10.

In the present exemplary embodiment, as an example, the drive motor 12 is installed in a vehicle rear section. When the drive motor 12 is driven, output from the drive motor 12 is transmitted to rear wheels 13 through a transmission mechanism, not illustrated in the drawings.

The FC stack 14 is provided in a vehicle front section. The FC stack 14 is a stack structure configured by stacking plural individual cells, each being one configuration unit. The FC stack 14 functions as a high voltage power source. Each individual cell configuring the FC stack 14 generates electricity using an electrochemical reaction between hydrogen gas supplied from the high pressure canister unit 10, described later, and compressed air supplied from an air compressor, not illustrated in the drawings. The vehicle 11 is also provided with a storage battery, not illustrated in the drawings. The storage battery is a rechargeable battery, and a nickel-hydrogen secondary battery, a lithium-hydrogen secondary battery, or the like may be employed therefor. Electric power is supplied to the drive motor 12 from the storage battery in order to drive the drive motor 12, and regenerated power is recovered from the drive motor 12 during deceleration and regeneration.

Figure 3:
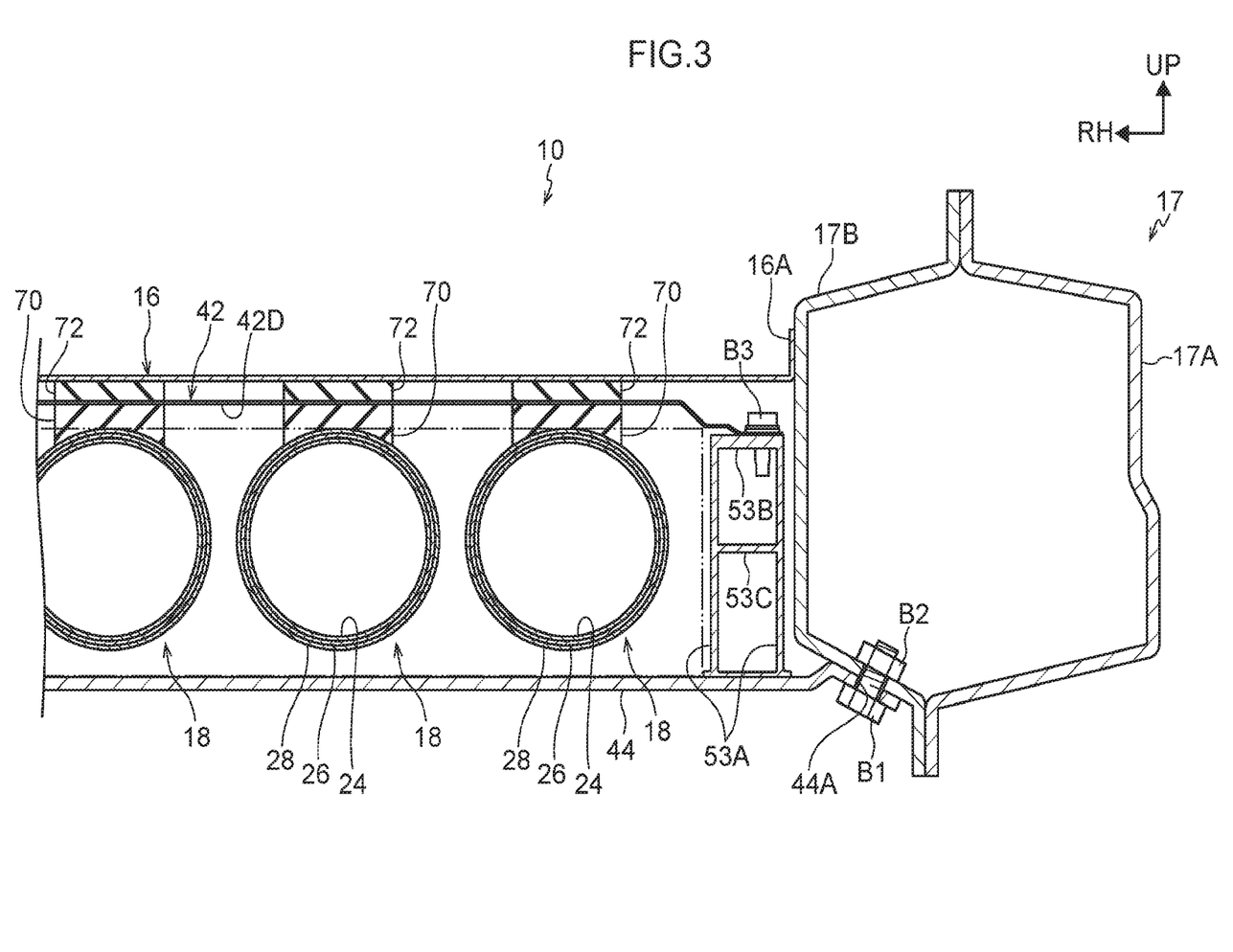
FIG. 3 is a partial cross-section illustrating a vehicle lower section structure according to the first exemplary embodiment in a state sectioned along the vehicle width direction.

A floor panel 16 configuring a floor of a vehicle cabin 19 is disposed in a lower section of the vehicle cabin 19 of the vehicle 11. A pair of rocker members 17, serving as vehicle framework members, are disposed running along the vehicle front-rear direction at both vehicle width direction outer sides of the floor panel 16. As illustrated in FIG. 3, each rocker member 17 has a closed cross-section structure configured by joining together an outer section 17A, positioned at the vehicle width direction outer side, and an inner section 17B, positioned at the vehicle width direction inner side. Vehicle outer side edges 16A of the floor panel 16 are joined to the inner sections 17B of the respective rocker members 17 by welding. Front seats 15A and rear seats 15B are disposed above the floor panel 16.

Figure 2:
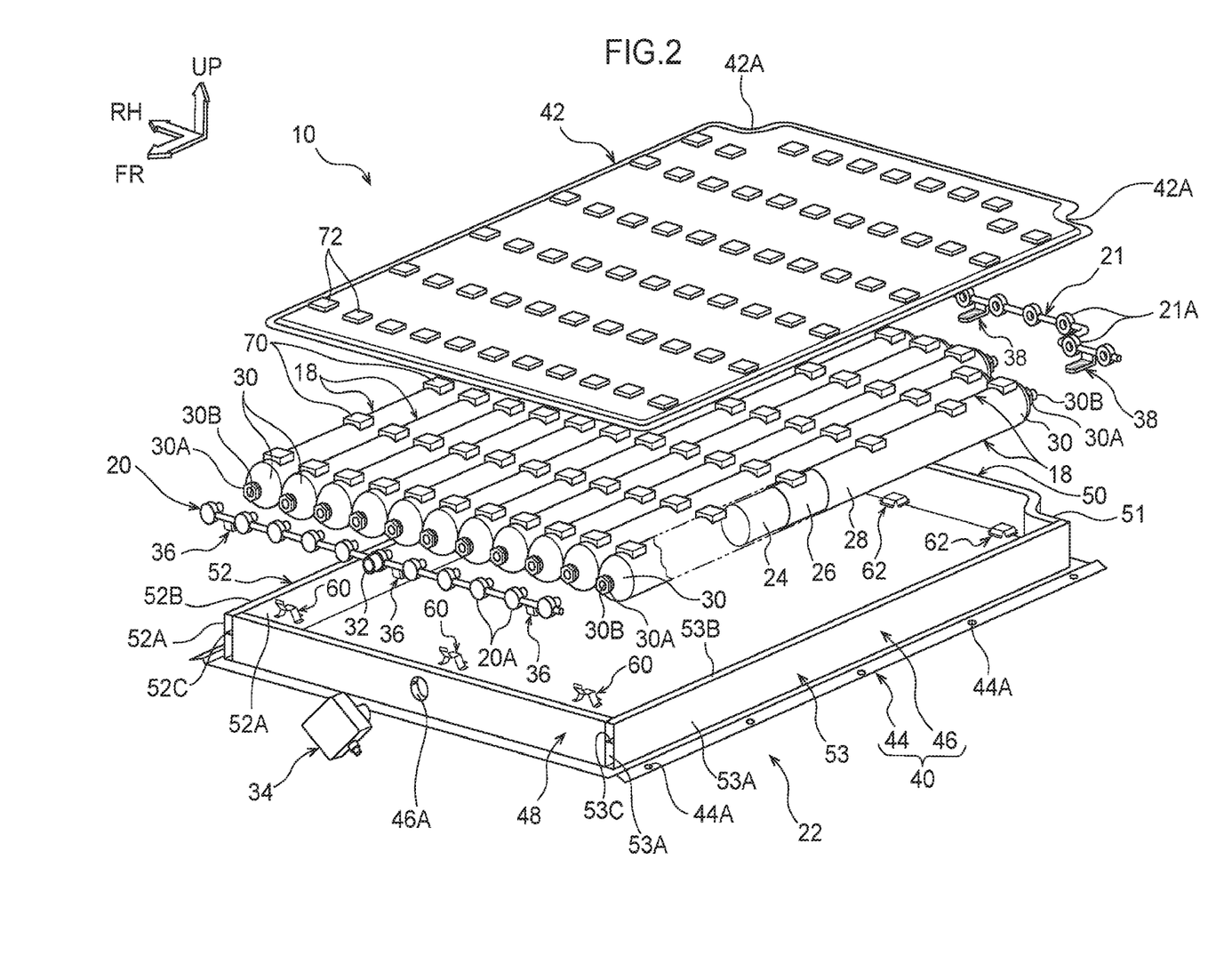
FIG. 2 is an exploded perspective view of a high pressure canister unit according to the first exemplary embodiment.

The high pressure canister unit 10 is disposed at the vehicle lower side of the floor panel 16. As illustrated in FIG. 2, the high pressure canister unit 10 is configured including plural canister bodies 18, a first tube 20, a second tube 21, a case 22, and an outgoing tube 32.

Each canister body 18 is formed in an elongated, substantially circular cylinder shape with an axial direction running along its length direction. The plural canister bodies 18 are arranged alongside one another in a radial direction of the canister bodies 18. In the present exemplary embodiment, as an example, eleven of the canister bodies 18 are disposed at a uniform spacing across the vehicle width direction such that their axial directions run in the vehicle front-rear direction.

The positions of vehicle front end portions of the eleven canister bodies 18 are aligned. The seven canister bodies 18 nearest the center of the vehicle are all formed with the same axial direction length as each other. The vehicle front end portions of the canister bodies 18 are disposed further toward the front than the front seats 15A. The two canister bodies 18 on the left of the vehicle and the two canister bodies 18 on the right of the vehicle are formed with a shorter vehicle front-rear direction (axial direction) length than the other canister bodies 18. Accordingly, rear end portions of these four canister bodies 18 are positioned further toward the vehicle front than rear end portions of the other canister bodies 18. The vehicle rear end portions of the canister bodies 18 are disposed further toward the rear than the front end of the rear seat 15B.

Of the canister bodies 18, those disposed at the two vehicle width direction edges are disposed further toward the vehicle outer sides than the vehicle width direction centers of the respective front seats 15A. The plural (eleven) canister bodies 18 are disposed so as to be packed horizontally below the floor panel 16.

As illustrated in FIG. 2, each of the canister bodies 18 is configured including a casing body 24, caps 30, a first reinforcing layer 26, and a second reinforcing layer 28. The casing body 24 is formed in a circular cylinder shape and is open at both axial direction end portions. In the present exemplary embodiment, as an example, the casing body 24 is configured from an aluminum alloy.

The caps 30 are provided at both axial direction end portions of the casing body 24. Each cap 30 has an axial direction running in the vehicle front-rear direction, and is formed in a substantially hemispherical dome shape protruding outward from the casing body 24 in the axial direction. Both ends of the casing body 24 are closed off by the caps 30. Note that in the present exemplary embodiment, the vehicle front end caps 30 are similar in configuration to the vehicle rear end caps 30. A connector 30A is provided projecting outward in the axial direction from a leading end portion of each cap 30. Each connector 30A includes an opening 30B. The first tube 20 and the second tube 21, described later, are connected to the respective openings 30B.

The first reinforcing layer 26 is provided on an outer peripheral face of the casing body 24. The first reinforcing layer 26 is formed from carbon fiber reinforced plastic (CFRP). Specifically, the first reinforcing layer 26 is formed using a sheet of CFRP that has been soaked in a thermosetting resin such as an epoxy resin. The CFRP is wrapped around the outer peripheral face of the casing body 24 and then heated to form the first reinforcing layer 26. Although not illustrated in the drawings, the fiber direction of the first reinforcing layer 26 corresponds to the circumferential direction of the casing body 24.

The second reinforcing layer 28 is provided on an outer peripheral face of the first reinforcing layer 26. The second reinforcing layer 28 is formed from CFRP. Specifically, CFRP filaments that have been soaked in a thermosetting resin such as an epoxy resin are wrapped around the outer peripheral faces of the first reinforcing layer 26 and the caps 30 and then heated to form the second reinforcing layer 28. Although not illustrated in the drawings, the fiber direction of the second reinforcing layer 28 corresponds to the axial direction of the casing body 24, or a direction at a predetermined angle with respect to the axial direction of the casing body 24.

Figure 4:
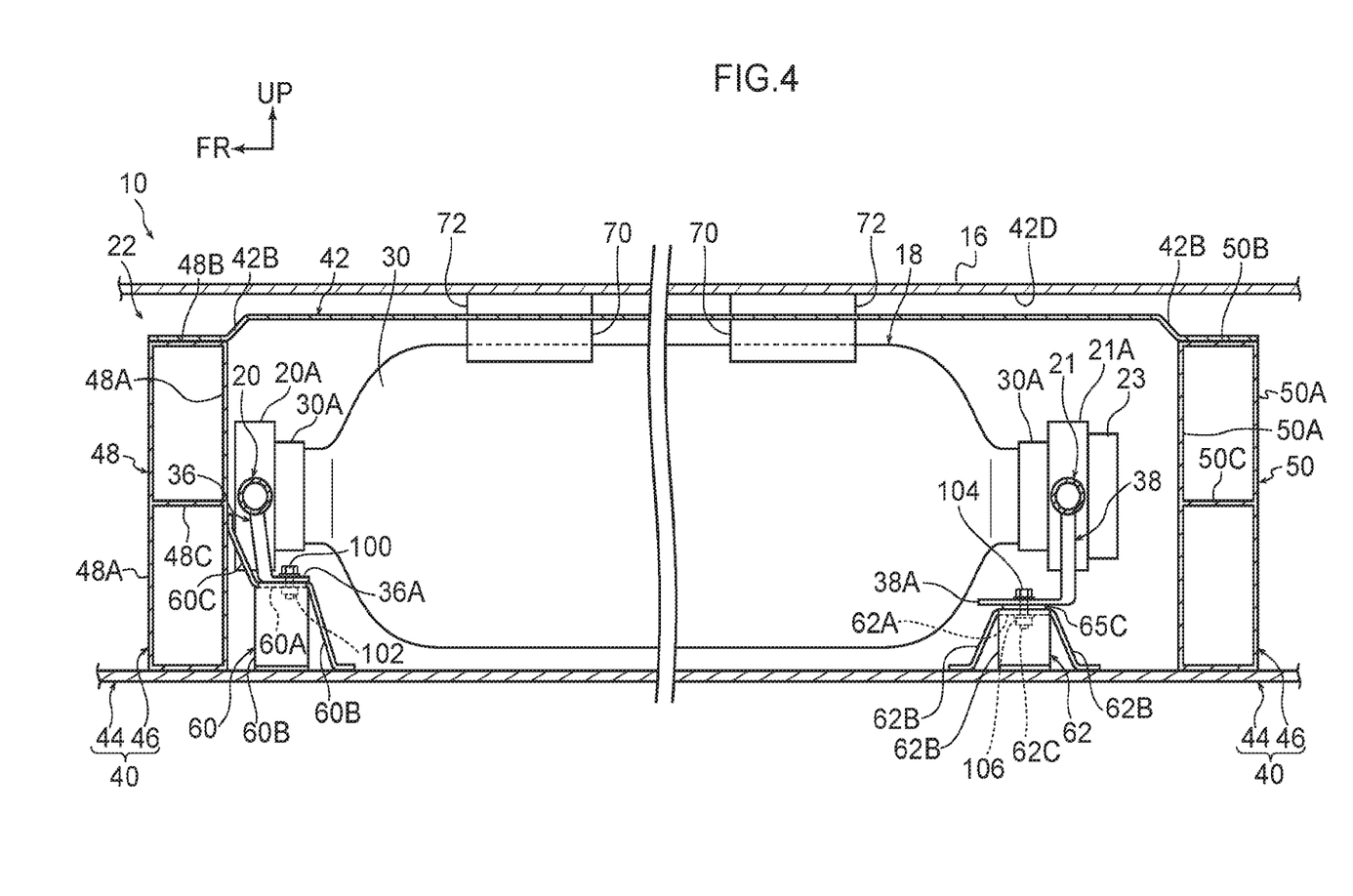
FIG. 4 is a partial cross-section illustrating a vehicle lower section structure according to the first exemplary embodiment in a state sectioned along the vehicle front-rear direction.

As illustrated in both FIG. 3 and FIG. 4, lower couplers 70 are disposed above the casing bodies 24. Plural of the lower couplers 70 are disposed along the axial direction of each canister body 18. In the present exemplary embodiment, one of the lower couplers 70 is disposed in the vicinity of each front and rear cap 30, and four of the lower couplers 70 are disposed therebetween to give a total of six lower couplers 70 per canister body 18. Each lower coupler 70 has an arc shaped lower face on the canister body 18 side that follows the outer periphery of the casing body 24 and contacts the outer periphery of the casing body 24. An upper face of each lower coupler 70 has a flat profile, and contacts a lower face 42D of a cover member 42, described later. Each lower coupler 70 is joined to either a casing body 24 or the cover member 42, and merely contacts the other out of the casing body 24 or the cover member 42. In the present exemplary embodiment, the lower couplers 70 are joined to the casing bodies 24. The lower couplers 70 may be formed from an elastic material, for example a resin such as rubber or an elastomer.

The canister bodies 18 configured as described above are coupled together in the vehicle width direction by the first tube 20 and the second tube 21. The first tube 20 is an elongated tube disposed so as to extend in the vehicle width direction (the array direction of the canister bodies 18) at the vehicle front of the canister bodies 18. The first tube 20 is provided with attachment portions 20A that are attached to the connectors 30A of the caps 30. Plural of the attachment portions 20A are provided corresponding to the positions of the canister bodies 18. In the present exemplary embodiment, eleven of the attachment portions 20A are provided. A male thread portion projecting toward the canister bodies 18 is provided to each of the attachment portions 20A. The openings 30B (connectors 30A) of the caps 30 are screwed onto the male thread portions, thereby fixing the canister bodies 18 to the first tube 20. A flow path is formed inside the first tube 20, and the interiors of the plural canister bodies 18 are placed in communication with each other through this flow path. Moreover, plural front attachment tabs 36 are provided to the first tube 20. The front attachment tabs 36 will be described in detail later.

The outgoing tube 32 is provided at a vehicle width direction intermediate portion of the first tube 20 (an intermediate portion in the array direction of the canister bodies 18). The outgoing tube 32 is a tube body projecting from the first tube 20 toward the vehicle front, and is provided to the attachment portion 20A at the vehicle width direction center of the first tube 20 in the present exemplary embodiment. The outgoing tube 32 leads out to the exterior through a through hole 46A formed in a peripheral wall 46 of the case 22, described later. The outgoing tube 32 is provided with a valve 34 capable of opening and closing the flow path through the first tube 20.

The second tube 21 is disposed at the vehicle rear of the canister bodies 18, and the rear end portions of the canister bodies 18 are coupled together in the vehicle width direction by the second tube 21. The second tube 21 includes plural (eleven in the present exemplary embodiment) attachment portions 21A, similarly to the first tube 20. The attachment portions 21A are provided with insertion holes into which the connectors 30A of the caps 30 are inserted. As illustrated in FIG. 4, in a state in which the connectors 30A are inserted into the attachment portions 21A, bolts 23 are screwed into the openings 30B (see FIG. 2) of the connector 30A from the axial direction outer side, thereby fixing the second tube 21 to the canister bodies 18. A flow path is formed inside the second tube 21, and the interiors of the plural canister bodies 18 are placed in communication with each other by the flow path. Moreover, as illustrated in FIG. 2, the second tube 21 is provided with plural rear attachment tabs 38. The rear attachment tabs 38 will be described in detail later.

Note that the canister bodies 18 and the first tube 20 are housed in the case 22. The case 22 is formed in a substantially rectangular box shape in plan view, and is configured including a case body 40 and the cover member 42.

The case body 40 is an upward-opening box, and is configured including a bottom wall 44 and the peripheral walls 46. The bottom wall 44 is formed from an aluminum alloy or the like, and has a substantially rectangular shape with rounded corners in plan view. Attachment holes 44A are formed spaced apart around the outer periphery of the bottom wall 44, and fastening members, such as bolts B1 and nuts B2, are used to fasten the bottom wall 44 to the rocker members 17. The case 22 is supported on the rocker members 17 by fastening in this manner.

The peripheral walls 46 project upward from the bottom wall 44, and are each formed by an extruded aluminum alloy component. The peripheral walls 46 form a rectangular frame shape in plan view. The outer profile configured by the peripheral walls 46 is formed large enough to surround the plural canister bodies 18. In the present exemplary embodiment, the outer profile of the peripheral walls 46 is formed large enough to house the eleven canister bodies 18.

The peripheral walls 46 are configured including a front wall 48 extending in the vehicle width direction at the vehicle front, a rear wall 50 extending along the vehicle width direction at the vehicle rear, and a right wall 52 and a left wall 53 coupling the two end portions of the front wall 48 to the two end portions of the rear wall 50 along the vehicle front-rear direction. The front wall 48, the rear wall 50, the right wall 52, and the left wall 53 are each configured with a closed cross-section structure. Specific explanation follows regarding this point.

As illustrated in FIG. 4, the cross-section profile of the front wall 48 is formed as a closed cross-section profile as viewed along the vehicle width direction. Specifically, the front wall 48 is configured including a pair of front and rear front vertical walls 48A projecting upward from the bottom wall 44 so as to be spaced apart from each other in the vehicle front-rear direction, a front upper wall 48B coupling upper ends of the front vertical walls 48A together from front to rear, and a front intermediate wall 48C coupling vertical direction intermediate portions of the front vertical walls 48A together from front to rear.

As illustrated in FIG. 2, the through hole 46A penetrating the front wall 48 in the vehicle front-rear direction is formed in a vehicle width direction central portion of the front wall 48. The outgoing tube 32 provided to the first tube 20 leads out to the exterior of the case 22 through the through hole 46A. The outgoing tube 32 is provided with the valve 34 that is capable of opening and closing the flow path of the first tube 20. This enables the amount of fluid flowing in the flow path to be controlled. One end of a tube, not illustrated in the drawings, is connected to the valve 34, and the other end of this tube is connected to the fuel cell stack or the like.

As illustrated in FIG. 4, similarly to the front wall 48, the cross-section profile of the rear wall 50 is formed as a closed cross-section profile as viewed along the vehicle width direction. Namely, the rear wall 50 is configured including a front and rear pair of rear vertical walls 50A projecting upward from the bottom wall 44 so as to be spaced apart from each other in the vehicle front-rear direction, a rear upper wall 50B coupling upper ends of the rear vertical walls 50A together from front to rear, and a rear intermediate wall 50C coupling vertical direction intermediate portions of the rear vertical walls 50A together from front to rear.

As illustrated in FIG. 2, similarly to the front wall 48 and the rear wall 50, the cross-section profiles of the right wall 52 and the left wall 53 are formed as closed cross-section profiles as viewed along the vehicle front-rear direction. The right wall 52 is configured including a left and right pair of right vertical walls 52A projecting upward from the bottom wall 44 so as to be spaced apart from each other in the vehicle width direction, a right upper wall 52B coupling upper ends of the right vertical walls 52A together in the width direction, and a right intermediate wall 52C coupling vertical direction intermediate portions of the right vertical walls 52A together in the width direction. The left wall 53 is configured including a left and right pair of left vertical walls 53A projecting upward from the bottom wall 44 so as to be spaced apart from each other in the vehicle width direction, a left upper wall 53B coupling upper ends of the left vertical walls 53A together in the width direction, and a left intermediate wall 53C coupling vertical direction intermediate portions of the left vertical walls 53A together in the width direction. The peripheral walls 46 thus form a frame member with a closed cross-section structure.

As illustrated in FIG. 2, indents 51 indented toward the vehicle front in plan view are configured on both vehicle width direction sides at rear end portions of the peripheral walls 46 (FIG. 2 illustrates only the indent 51 on the left of the vehicle). The length of the interior of the case 22 in the vehicle front-rear direction is thus shorter at the two vehicle width direction ends than at the vehicle width direction center. As described above, the canister bodies 18 housed on either vehicle width direction side are therefore canisters that have a shorter vehicle front-rear direction (axial direction) length than the other canister bodies 18.

As illustrated in FIG. 2, the cover member 42 is formed in a flat plate shape from an aluminum alloy or the like, and has a profile corresponding to that of the peripheral walls 46. Both vehicle width direction ends of a rear end portion of the cover member 42 are thus formed with indents 42A indented toward the vehicle front in plan view, corresponding to the peripheral walls 46. Moreover, as illustrated in FIG. 3 and FIG. 4, a step 42B is formed running along an outer peripheral edge portion of the cover member 42. A portion of the cover member 42 located further to the peripheral outer side than the step 42B overlaps upper faces of the peripheral walls 46, and is fastened thereto using fastening members such as bolts B3. In this manner, the upper opening of the case body 40 is closed off by the cover member 42. In this closed-off state, the lower face 42D of the cover member 42 abuts the lower couplers 70. Gaps are formed between the cover member 42 and the canister bodies 18 at locations other than the locations provided with the lower couplers 70.

Upper couplers 72 are disposed between the cover member 42 and the floor panel 16. The upper couplers 72 are disposed at positions corresponding to the lower couplers 70, namely at positions superimposed on the lower couplers 70 in plan view. Each upper coupler 72 is joined to either the floor panel 16 or the cover member 42, and merely contacts the other out of the floor panel 16 or the cover member 42. In the present exemplary embodiment, the lower couplers 70 are joined to the cover member 42. The upper couplers 72 may be formed from an elastic material, for example a resin such as rubber or an elastomer.

A load transmission member of the present disclosure is configured including the upper couplers 72 and the lower couplers 70. Load from the floor panel 16 is transmitted to the canister bodies 18 through the upper couplers 72 and the lower couplers 70.

As illustrated in FIG. 2 and FIG. 4, first attachment brackets 60 are provided at the vehicle front of the bottom wall 44. Plural of the first attachment brackets 60 are provided spaced apart from each other in the vehicle width direction, with three of the first attachment brackets 60 being provided in the present exemplary embodiment. The first attachment brackets 60 are provided between neighboring canister bodies 18.

As illustrated in FIG. 4, the first attachment brackets 60 are brackets that are joined to the bottom wall 44 and the front wall 48 (peripheral walls 46) to support the first tube 20. Each first attachment bracket 60 is configured including a support portion 60A, legs 60B, and a front extension portion 60C.

The support portion 60A is a flat plate shaped location formed in a substantially rectangular shape in plan view, and the disposed at a position separated in the vehicle upward direction from the bottom wall 44. Three of the legs 60B extend toward the bottom wall 44 from a rear end portion and both vehicle width direction end portions of the support portion 60A respectively (only a leg 60B extending toward the vehicle rear and a leg 60B extending toward the right of the vehicle are illustrated in FIG. 4). Each of the legs 60B extends obliquely downward from the support portion 60A toward the bottom wall 44, and a lower end portion of each leg 60B is bent so as to follow the bottom wall 44 and is joined to the bottom wall 44.

The front extension portion 60C extends obliquely upward toward the peripheral wall 46 from a front end portion of the support portion 60A. A front end portion of the front extension portion 60C is bent upward to follow the peripheral wall 46 and is joined to the front wall 48 (peripheral wall 46).

The first tube 20 is provided with the front attachment tabs 36. Each of the front attachment tabs 36 extends downward from between neighboring attachment portions 20A of the first tube 20. A lower end portion of each front attachment tab 36 is provided with a flange 36A bent toward the vehicle rear. Each flange 36A overlaps the support portion 60A of a first attachment bracket 60 and is fastened thereto using a bolt 100 and a nut 102.

Second attachment brackets 62 are provided at the vehicle rear of the bottom wall 44. Plural of the second attachment brackets 62 are provided spaced apart from each other in the vehicle width direction, with three of the second attachment brackets 62 being provided in the present exemplary embodiment (only two of the second attachment brackets 62 are illustrated in FIG. 2). The second attachment brackets 62 are provided at positions corresponding to the first attachment brackets 60 (between neighboring canister bodies 18) in the vehicle width direction.

The second attachment brackets 62 are brackets that are joined to the bottom wall 44 and that support the second tube 21. Each second attachment bracket 62 is configured including a support portion 62A and legs 62B.

The support portion 62A is a flat plate shaped location formed in a substantially rectangular shape in plan view, and is disposed at a position separated in the vehicle upward direction from the bottom wall 44. A first attachment hole 62C is formed penetrating a central portion of the support portion 62A in the thickness direction of the support portion 62A.

Four of the legs 62B extend toward the bottom wall 44 from front, rear, left, and right edges of the support portion 60A. Each leg 62B extends obliquely downward from the support portion 62A toward the bottom wall 44, and a lower end portion of each leg 62B is bent so as to follow the bottom wall 44 and is joined to the bottom wall 44.

The rear attachment tabs 38 extend downward from between neighboring attachment portions 21A of the second tube 21. A lower end portion of each rear attachment tab 38 is provided with a flange 38A bent toward the vehicle front. The flanges 38A extend in the vehicle front-rear direction between neighboring canister bodies 18.

A second attachment hole 38B is formed through each flange 38A. A bolt 104 is inserted through the first attachment hole 62C formed in the support portion 62A of each second attachment bracket 62, and through the second attachment hole 38B in the flange 38A. The bolt 104 is screwed into a nut 106 at a lower face side of the support portion 62A, thereby fastening the two components (the support portion 62A and the flange 38A) together.

The canister bodies 18 are supported above the bottom wall 44 by the front attachment tabs 36 and the first attachment brackets 60, and are supported above the bottom wall 44 by the rear attachment tabs 38 and the second attachment brackets 62, in a state in which the canister bodies 18 are separated from the bottom wall 44.

Next, explanation follows regarding operation and advantageous effects of the present exemplary embodiment.

As illustrated in FIG. 2, the present exemplary embodiment includes the plural circular cylinder shaped canister bodies 18 as an array of high pressure canisters that store hydrogen fuel. This thereby enables the degrees of freedom with regard to, for example, height and width when disposing the canister bodies 18 below the floor panel 16, to be increased in comparison to cases in which hydrogen is stored in a single large-capacity high pressure canister.

One axial direction end portion of each of the canister bodies 18 is coupled to the first tube 20. The other axial direction end portion of each of the canister bodies 18 is coupled to the second tube 21. The interiors of the canister bodies 18 are thereby placed in communication with each other through the tubes 20, 21. This thereby enables the plural canister bodies 18 to form a unit that functions as a single high pressure canister, thereby enabling the required capacity to be secured easily.

Moreover, in the present exemplary embodiment, when load is input from above the floor panel 16, for example when an occupant enters or leaves or when cargo is loaded, part of the load is borne by the rocker members 17 through the vehicle outer side edges 16A of the floor panel 16. The remainder of the load input from above the floor panel 16 is borne by the canister bodies 18 through the upper couplers 72, the cover member 42, and the lower couplers 70. Moreover, the load is transmitted to the bottom wall 44 via the first tube 20, the front attachment tabs 36, and the first attachment brackets 60, and the load is also transmitted to the bottom wall 44 via the second tube 21, the rear attachment tabs 38, and the second attachment brackets 62. The load transmitted to the bottom wall 44 is then transmitted to the rocker members 17.

In this manner, in the present exemplary embodiment, instead of being transmitted to the rocker members 17 through the vehicle outer side edges 16A of the floor panel 16 alone, load from above the floor panel 16 is also transmitted to the rocker members 17 through the canister bodies 18. Namely, the load can also be borne by the canister bodies 18 instead of by the floor panel 16 alone, thereby enabling load-bearing performance to be improved.

Moreover, in the present exemplary embodiment, the upper couplers 72 and the lower couplers 70 are formed from elastic bodies. This thereby enables the input load to be absorbed by elastic deformation of the upper couplers 72 and the lower couplers 70. Moreover, the upper couplers 72 and the lower couplers 70 are disposed at mutually superimposed positions in plan view. Load is therefore transmitted smoothly through the elastic bodies.

Moreover, in the present exemplary embodiment, the canister bodies 18 are housed inside the box-shaped case 22. Foreign objects and the like can thus be suppressed from entering the case 22, enabling the canister bodies 18 to be protected.

Moreover, in the present exemplary embodiment, the plural canister bodies 18 are disposed side-by-side with the cylinder axial direction, this being the length direction, of each canister body 18 running in the same direction. This thereby enables more of the canister bodies 18 to be disposed below the floor panel 16, in a space-efficient manner.

Moreover, in the present exemplary embodiment, the plural canister bodies 18 are disposed such that the cylinder axial direction, this being the length direction, of each canister body 18 runs in the vehicle front-rear direction. This thereby enables the length of a single canister body 18 to be made longer than in cases in which the canister bodies 18 are disposed with their length direction running in the vehicle width direction. A greater capacity can thus be secured with fewer of the canister bodies 18 in cases in which canister bodies 18 of the same diameter are disposed.

Figure 5:
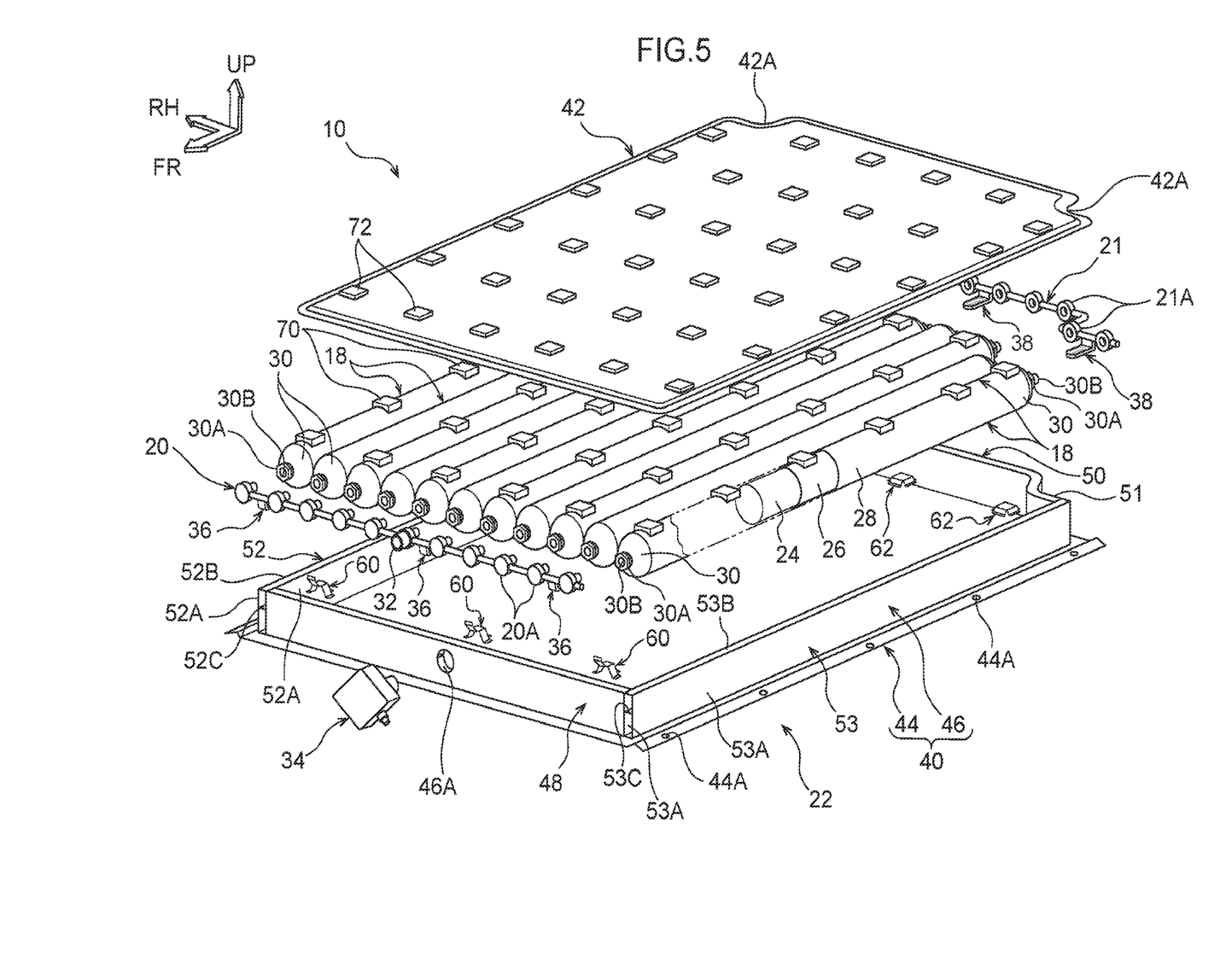
FIG. 5 is an exploded perspective view of a high pressure canister unit according to a modified example of the first exemplary embodiment.

Note that in the present exemplary embodiment, the lower couplers 70 are provided to all of the canister bodies 18. However, configuration may be made in which the lower couplers 70 are only provided to some of the canister bodies 18. For example, as illustrated in FIG. 5, the lower couplers 70 may be provided to every second canister body 18 in the vehicle width direction, with the upper couplers 72 being provided at positions corresponding to the lower couplers 70.

Moreover, the upper couplers 72 do not necessarily have to be disposed at positions corresponding to the lower couplers 70. The upper couplers 72 may be disposed at positions that are not superimposed on the lower couplers 70 in plan view.

Second Exemplary Embodiment

Figure 6:
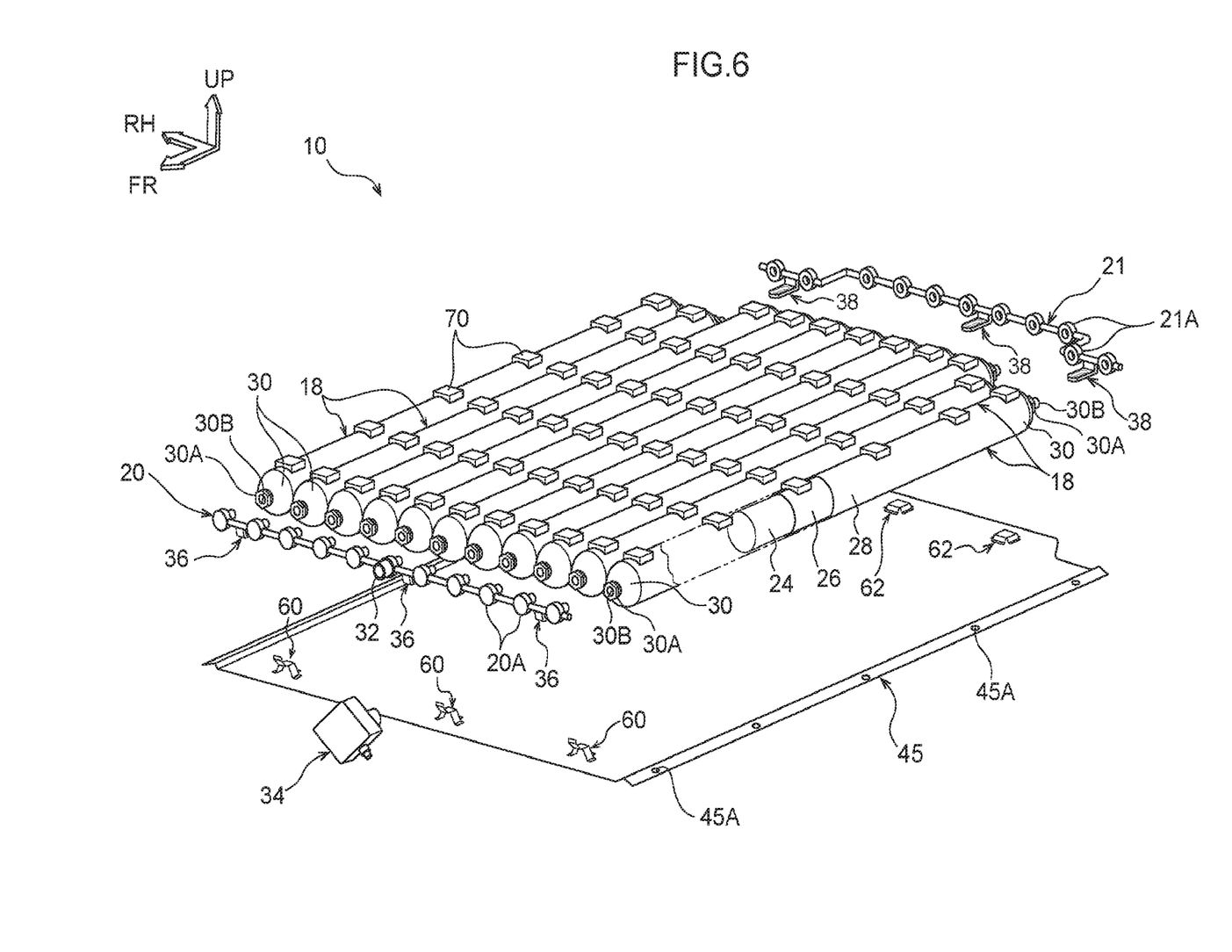
FIG. 6 is an exploded perspective view of a high pressure canister unit according to a second exemplary embodiment.
Figure 7:
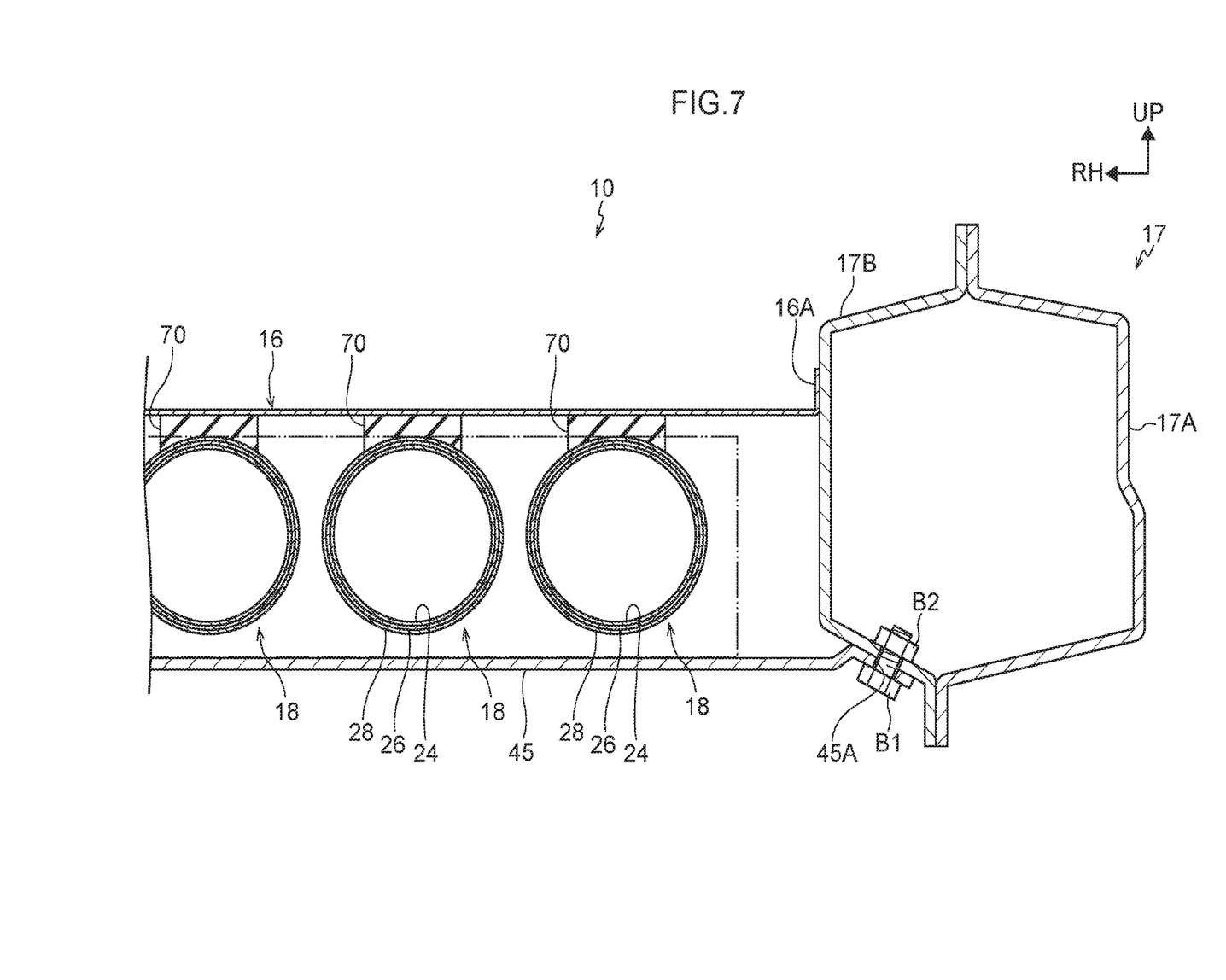
FIG. 7 is a partial cross-section illustrating a vehicle lower section structure according to the second exemplary embodiment in a state sectioned along the vehicle width direction.

Next, explanation follows regarding a vehicle lower section structure according to a second exemplary embodiment of the present disclosure, with reference to FIG. 6 and FIG. 7. Note that structures similar to those of the first exemplary embodiment are allocated the same reference numerals, and explanation thereof is omitted as appropriate.

As illustrated in FIG. 6, in the present exemplary embodiment, a support panel 45 is formed by only a plate member configuring the bottom wall 44 of the case 22, and neither the peripheral walls 46 (front wall 48, rear wall 50, right wall 52, left wall 53), nor the cover member 42, are provided. Attachment holes 45A are formed spaced apart from each other around an outer peripheral portion of the support panel 45, and the support panel 45 is fastened to the rocker members 17 in a similar manner to the bottom wall 44 of the first exemplary embodiment. The support panel 45 is supported by the rocker members 17 due to this fastening.

The lower couplers 70 are provided above the canister bodies 18. The lower couplers 70 abut a lower face of the floor panel 16. In the present exemplary embodiment, load from the floor panel 16 is transmitted to the canister bodies 18 through the lower couplers 70.

Next, explanation follows regarding operation and advantageous effects of the present exemplary embodiment.

In the present exemplary embodiment, similarly to in the first exemplary embodiment, the degrees of freedom with regard to, for example, height and width when disposing the canister bodies 18 below the floor panel 16 can be increased, and the load-bearing performance of the floor panel 16 can also be improved. The lower couplers 70 are formed from elastic bodies, thereby enabling input load to be absorbed by elastic deformation of the lower couplers 70.

Moreover, in the present exemplary embodiment, the support panel 45 is disposed so as to cover lower faces of the canister bodies 18, and the support panel 45 supports the canister bodies 18. This thereby enables the canister bodies 18 to be protected from impacts from below the vehicle or being struck by foreign objects using a simple structure.

Note that in the first and the second exemplary embodiments, the canister bodies 18 are supported by the rocker members 17. However, the canister bodies 18 may be supported by another vehicle framework member. For example, the canister bodies 18 may be supported by cross members (not illustrated in the drawings) spanning between the rocker members 17.

Explanation has been given regarding exemplary embodiments of the present disclosure. However, the present disclosure is not limited to the above, and obviously various other modifications may be implemented within a range not departing from the spirit of the present disclosure.

What is claimed is:

1. A vehicle lower section structure comprising:
 a floor panel that is provided at a lower section of a vehicle cabin;
 a circular cylinder shaped high pressure canister that is disposed below the floor panel and that is supported by a vehicle framework member;
 a case that houses the high pressure canister; and
 a load transmission member that is disposed between the floor panel and the high pressure canister that includes a first portion located outside the case and a second portion located inside the case, and that transmits load from the floor panel to the high pressure canister.

2. The vehicle lower section structure of claim 1, wherein the load transmission member is formed by an elastic body having elastic properties.

3. The vehicle lower section structure of claim 1, further comprising:
 a support panel that is disposed so as to cover a lower face of the high pressure canister and that supports the high pressure canister, and wherein:
 the vehicle framework member includes a pair of rocker members arranged on each vehicle width direction outer side and extending along a vehicle front-rear direction, and
 the support panel is coupled to the rocker members at both vehicle width direction edge portions of the support panel and is disposed between the pair of rocker members.

4. The vehicle lower section structure of claim 2, further comprising:
 a support panel that is disposed so as to cover a lower face of the high pressure canister and that supports the high pressure canister, and wherein:
 the vehicle framework member includes a pair of rocker members arranged on each vehicle width direction outer side and extending along a vehicle front-rear direction, and
 the support panel is coupled to the rocker members at both vehicle width direction edge portions of the support panel and is disposed between the pair of rocker members.

5. The vehicle lower section structure of claim 3, wherein the case is a box-shaped case including a bottom wall formed by at least pan of the support panel, a peripheral wall projecting upward from the bottom wall so as to surround the bottom wall, and a cover member disposed on the opposite side of the peripheral wall to the bottom wall, and
 the first portion of the load transmission member includes an upper coupler coupling an upper face of the cover member and the floor panel together, and the second portion of the load transmission member includes a lower coupler coupling a lower face of the cover member and the high pressure canister together.

6. The vehicle lower section structure of claim 4, wherein the case is a box-shaped case including a bottom wall formed by at least part of the support panel, a peripheral wall projecting upward from the bottom wall so as to surround the bottom wall, and a cover member disposed on the opposite side of the peripheral wall to the bottom wall, and
 the first portion of the load transmission member includes an upper coupler coupling an upper face of the cover member and the floor panel together, and the second portion of the load transmission member includes a lower coupler coupling a lower face of the cover member and the high pressure canister together.

7. The vehicle lower section structure of claim 1, wherein a plurality of high pressure canisters are disposed along the floor panel such that a cylinder axial direction of each high pressure canister runs in a same direction.

8. The vehicle lower section structure of claim 2, wherein a plurality of high pressure canisters are disposed along the floor panel such that a cylinder axial direction of each high pressure canister runs in a same direction.

9. The vehicle lower section structure of claim 3, wherein a plurality of high pressure canisters are disposed along the floor panel such that a cylinder axial direction of each high pressure canister runs in a same direction.

10. The vehicle lower section structure of claim 5, wherein a plurality of high pressure canisters are disposed along the floor panel such that a cylinder axial direction of the each high pressure canister runs in a same direction.

11. The vehicle lower section structure of claim 1, wherein the high pressure canister is disposed with a length direction of the high pressure canister running in a vehicle front-rear direction.

12. The vehicle lower section structure of claim 2, wherein the high pressure canister is disposed with a length direction of the high pressure canister running in a vehicle front-rear direction.

13. The vehicle lower section structure of claim 3, wherein the high pressure canister is disposed with a length direction of the high pressure canister running in a vehicle front-rear direction.

14. The vehicle lower section structure of claim 5, wherein the high pressure canister is disposed with a length direction of the high pressure canister running in a vehicle front-rear direction.

15. The vehicle lower section structure of claim 1, wherein the first portion of the load transmission member and the second portion of the load transmission member are disposed at mutually superimposed positions in plan view.

* * * * *